United States Patent
Mueller et al.

[11] 3,794,426
[45] Feb. 26, 1974

[54] HOLOGRAPHIC SPECTROMETER

[75] Inventors: Rolf K. Mueller, Brighton, Mich.; Adolf W. Lohmann, La Jolla, Calif.

[73] Assignee: The Bendix Corporation, Southfield, Mich.

[22] Filed: Dec. 8, 1972

[21] Appl. No.: 313,228

Related U.S. Application Data

[62] Division of Ser. No. 176,623, Aug. 31, 1971, abandoned.

[52] U.S. Cl............... 356/98, 350/3.5, 350/162 ZP
[51] Int. Cl................................................ G01j 3/28
[58] Field of Search........... 350/3.5, 162 R, 162 ZP; 356/74, 79, 98

[56] References Cited
UNITED STATES PATENTS
2,463,280   3/1949   Kaehni et al...................... 356/98 X
3,680,943   8/1972   Ogden et al. ........................ 350/3.5

Primary Examiner—Ronald L. Wibert
Assistant Examiner—F. L. Evans
Attorney, Agent, or Firm—Lester L. Hallacher

[57] ABSTRACT

A spectrometer employing the principles of single point holograms, that is, Fresnel zone plate patterns (FZP), is described. The holographic recording medium and the pinhole required for making an FZP are permanently arranged on opposite sides of a transparent support medium. The interference pattern is then recorded by illuminating the recording medium with monochromatic light of a selected wavelength. Spectral analysis of light which is not monochromatic can later be made by illuminating the recorded interference pattern and by varying the optical path length between the interference pattern and a second pinhole positioned in front of a detector. Changes in the optical path between the second pinhole and the interference pattern correspond to changes in the wavelength of light which is focused on the permanently positioned pinhole. Different wavelengths can thus be detected by varying the optical path length between the second pinhole and the interference pattern and noting the intensity which passes through the fixed pinhole. The permanent mounting relationship of the illuminated pinhole and the interference pattern eliminates the usual difficulty of aligning these two components to some small fraction of a wavelength, and any aberrations produced by the structure or recording medium are cancelled during the illumination of the pattern.

9 Claims, 8 Drawing Figures

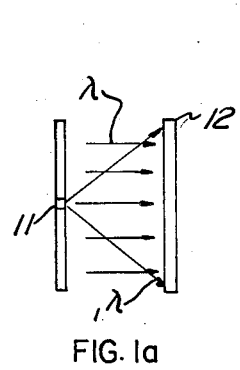
FIG. 1
PRIOR ART
FIG. 1a
FIG. 1b
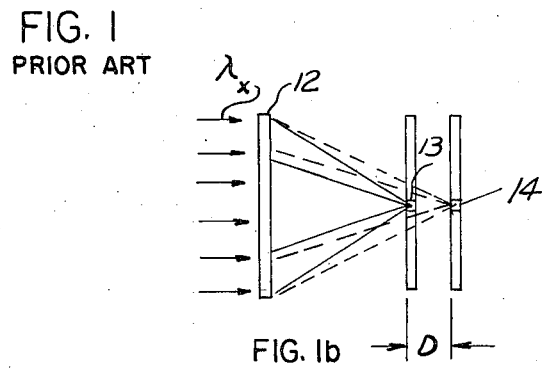
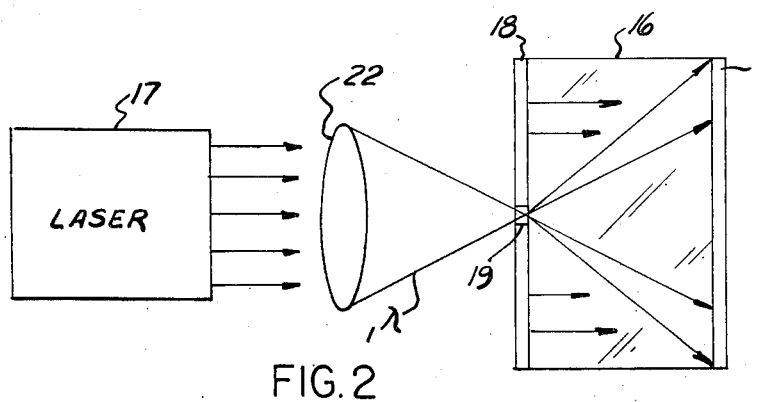
FIG. 2
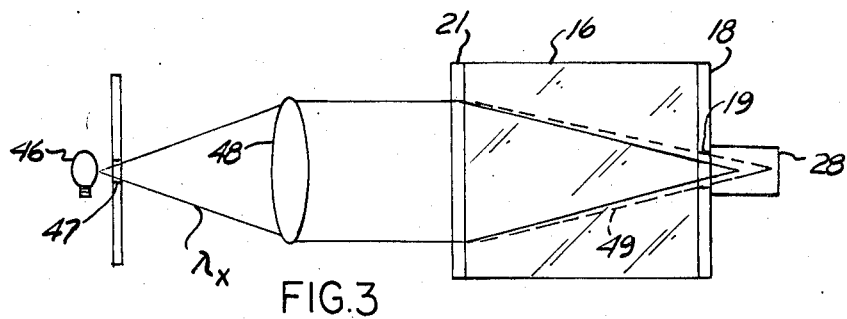
FIG. 3
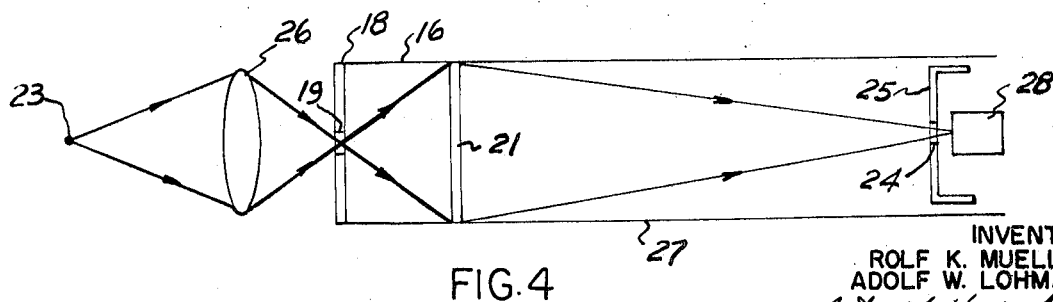
FIG. 4
INVENTORS
ROLF K. MUELLER
ADOLF W. LOHMANN
BY
ATTORNEY FIG. 5
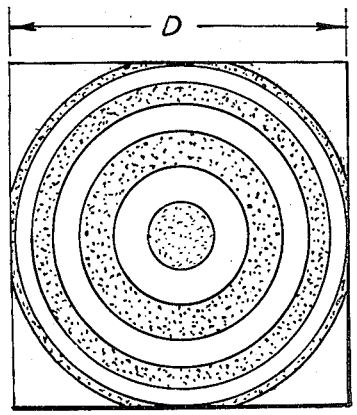
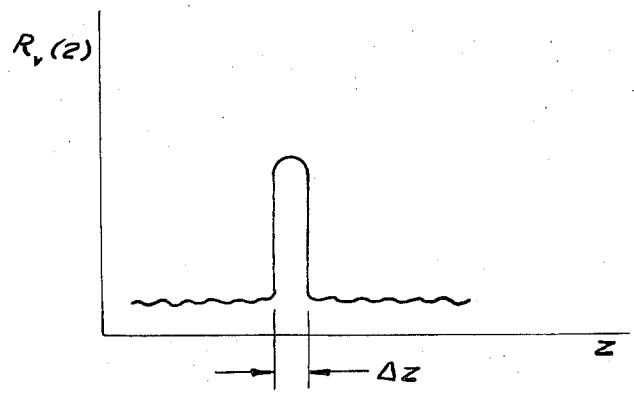
FIG. 6
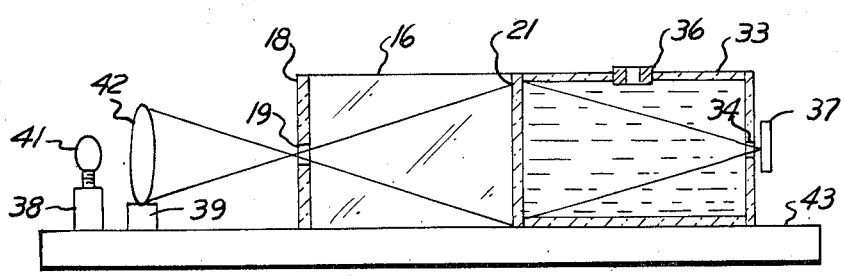
FIG. 7

HOLOGRAPHIC SPECTROMETER

This is a division of application Ser. No. 176,623 filed Aug. 31, 1971, now abandoned.

BACKGROUND OF THE INVENTION

Many applications for spectrometers, also called spectrum analyzers, are known. For example, the various wavelengths of energy composing a whitelight source can be identified using such an instrument. Also, such an instrument can be used to detect the presence of a particular chemical, element, or compound in the atmosphere. They thus can be used to detect or measure air pollution. As is known, many other uses exist for spectrometers, and the above are offered as exemplary only.

Because of the many existing applications for spectrometers, substantial effort has been spent in attempts to make them more economical and more accurate. Because of the theoretically possible accuracy of lasers attempts have been made to utilize these instruments in spectrometers by making use of the principles of holograms and Fresnal zone plate patterns (FZP).

The hologram of a single point object is a Fresnel zone plate pattern. An FZP acts as a lens with a focal length $$f = R_1^2 / 2n\lambda$$

where:

$R_1$ represents the distance to the first ring in the FZP, n is the refractive index of the propagating medium, and $\lambda$ equals the wavelengths of the illuminating energy in vacuo.

Because the focal length depends upon the wavelength of the illuminating energy, it is possible to use a Fresnel zone plate as a wavelength selective device, that is, a spectrometer.

This can be understood by viewing FIG. 1, which illustrates the known technique and is useful in explaining the difficulties of this technique which have made it impractical and uncommercial. As illustrated in FIG. 1a, a Pinhole 11 is illuminated with a source such that light having a wavelength $\lambda_1$ diverges to fully illuminate a Recording Medium 12. An interference pattern can be formed by simultaneously illuminating the Recording Medium 12 with parallel rays from a second point source of energy also having a wavelength of $\lambda_1$ and coherent with the first source. The interference pattern is permanently recorded. For example, the recording medium can be a photographic material which is subsequently developed to form the interference pattern. After the interference pattern is permanently developed, it can be used to selectively pass the wavelength of light which illuminates the permanently recorded interference pattern. This is illustrated with respect to FIG. 1b, where energy having a wavelength $\lambda_x$ illuminates the Interference Pattern 12 such that the illuminating rays are substantially parallel. If the wavelength of $\lambda_x$ is equal to the wavelength $\lambda_1$ which formed the interference pattern, an appreciable portion of the light passing through the interference pattern will focus at a Pinhole 13, which is located a distance exactly equal to the distance between the Pinhole 11 and the Interference Pattern 12 of FIG. 1a. However, if the wavelength $\lambda_x$ is different from $\lambda_1$, the illuminating energy will focus at a Point 14, which is spaced from Pattern 12 differently from the spacing between Pinhole 11 and Recording Medium 12 during the formation of the interference pattern. The distance D between Pinhole 13 and Point 14 represents the change of wavelength between the illuminating energy which formed the interference pattern and the white light which subsequently illuminates the permanently recorded interference pattern. The distance D therefore can be utilized as a means of determining the wavelength $\lambda_x$ of the energy which illuminates the permanently recorded interference pattern.

If the energy illuminating the permanently recorded Pattern 12 is white light so that it contains several wavelengths of light, the presence of these wavelengths can be detected by moving the Pinhole 13 and noting the positioning at which the maximum output is received from the pinhole. The distance that the pinhole is moved is recorded and is indicative of one of the wavelengths of energy forming the composite white light.

This is a theoretically feasible system but practically is very difficult to achieve because the exact positioning of Pinhole 13 is extremely critical, especially since it must be very small to achieve good discrimination, and therefore it is extremely difficult to accurately arrange and calibrate the system. Furthermore, the movement of Pinhole 13 to a subsequent Position 14 is extremely critical because the lateral tolerance in its position is very minute. As a consequence, exact position measurements are difficult to achieve.

SUMMARY OF THE INVENTION

In the inventive system the positioning problem is overcome by forming the holographic interference pattern onto a recording medium which is permanently positioned with respect to the pinhole. The permanent positioning is retained while spectrographic measurements are made using the interference pattern. By using the same optical system to record the interference pattern and to make the measurements, errors occasioned by faults in the optical systems are automatically compensated for. After the interference pattern is formed, spectrographic measurements of white light can be made by varying the length of the optical path light travels through the system. This variation in optical path causes the various wavelengths of energy composing the white light source to focus at different spatial points within the system. Hence, by varying the optical path for each wavelength of light in the light source, so that each wavelength is focused at a detector positioned behind a second pinhole, and by noting the optical path change required for focusing each wavelength, it is possible to identify the component wavelengths of the white light source.

The invention accordingly contemplates scanning the spectrum $S(\lambda)$ of an illumination source by selectively changing the optical path length of light through the system. This change can be made in either of several ways. The first technique for changing the optical path length includes interposing a movable reconstructing pinhole between the interference pattern and the detector. As the reconstructing pinhole is moved along an axis perpendicular to the plane of the interference pattern a specific wavelength $\lambda_s$ is focused at $f(\lambda) = R_1^2/2\lambda$. Hence, proper positioning of the movable pinhole results in maximum output of the illumination passing through the fixed pinhole. At the same time unfocused wavelengths will be almost entirely rejected by the fixed recording pinhole. This rejection can be improved by placing a disc stop at the center of the interference pattern, if desired. The alignment of the moving pinhole can now be much less critical, by making $f(\lambda)$ large compared with the distance between the fixed pinhole and the interference pattern.

The second technique of changing the optical path length includes changing the refractive index of the system while maintaining all spacings constant (i.e., both pinholes and the interference pattern are fixed dimensionally). The index of refraction between the interference pattern and the fixed recording pinhole can be changed, or the refractive index between the interference pattern and a fixed reconstructing pinhole can be changed, or both can be changed. In either event the refractive index change required for each wavelength to focus at the appropriate pinhole is indicative of the focused wavelength.

Permanent dimensional positioning between the interference pattern and the pinhole is achieved by forming these two elements on the opposite surfaces of a support element which is transparent to the radiation to be analyzed. Accordingly, a glass or plastic element, such as a cube or right cylinder, will have the interference recording medium and the pinhole formed on opposite sides such that they face one another. During the recording of the interference pattern, the thin recording medium layer is simultaneously illuminated via the fixed pinhole and a reference source of illumination having a wavelength and phase identical to that passing through the pinhole. After the interference pattern is permanently recorded, spectrographic measurements can be made by illuminating the fixed recording pinhole and thence the interference pattern. Wavelengths which are identical to those which cause the interference pattern will then focus at the reconstructing pinhole while other wavelengths will focus either in front of or beyond the reconstructing pinhole. These other wavelengths can be caused to focus at the reconstructing pinhole by varying the optical path between it and the interference pattern. By noting the amount of energy which passes through the reconstructing pinhole and on to the detector, the various spectral components of the white light source can be detected and identified.

BRIEF DESCRIPTION OF THE DRAWINGS

FIG. 1 shows a prior art technique of forming and using a Fresnal Zone Plate; FIG. 1a shows the method of forming the Fresnal Zone Plate; and FIG. 1b shows how the permanently recording Fresnal Zone Plate is used to make spectrographic measurements.

FIG. 2 is a preferred embodiment of the inventive system showing how the pinhole and interference pattern are permanently spaced.

FIG. 3 is a simplified showing of a technique of utilizing the inventive structure as a spectrometer which employs a movable pinhole between the energy source and interference pattern.

FIG. 4 is an embodiment employing a movable pinhole positioned after the interference pattern.

FIG. 5 shows a Fresnal Ring Interference Pattern resulting at the recording medium.

FIG. 6 shows the output present at the detector when the source is monochromatic at a function of optical path length.

FIG. 7 is a preferred embodiment in which variations in optical path length are affected by changing the index of refraction of the optical system.

DETAILED DESCRIPTION

In the following description the invention is described with respect to a spectrometer usable in analyzing the wavelength distribution and composition of white light. However, the invention has equal applicability to the detection of gases, chemicals, elements, or pollutants which may exist in the atmosphere or in other fluids.

FIG. 2 shows a first preferred embodiment of the invention in somewhat simplified form. The invention consists of a Support Medium 16 which is transparent to the energy under consideration. In this example the energy is monochromatic light received from a Laser Source 17. Support 16 can be made from glass, plastic, or any other solid medium which is transparent to the output energy of Laser 17. The cross-sectional configuration of Support 16 can be square, circular, or any other convenient configuration, depending upon the particular application of the system. Support 16 is configured to have two parallel plane surfaces which support the active portions of the Support Element. Disposed on one of the parallel surfaces is a Material 18 containing a Pinhole 19. Material 18 is selected in either of several manners. Firstly, it can be completely opaque to the light from Laser 17. If this type of masking is used to form Pinhole 19 on Surface 18, it is necessary to provide another mechanism for directing a reference beam to the Energy Sensitive Material 21 which is provided on the other surface of Support Medium 16. The reference beam can be arranged to illuminate Recording Layer 21 from either the side facing Pinhole 19 or the other side. Secondly, Material 18 can be such that it absorbs a portion of the incident energy and transmits a portion of the incident energy. The transmitted portion then serves as the required reference beam. Thirdly, Material 18 can be a transparent material with an index of refraction which is different from that of Support Material 16. In this event Pinhole 19 is formed in Layer 18 causes the formation of Fresnal Rings because of the energy focused by Lens 22. Simultaneously, parallel and other unfocused energy rays pass through Material 18 to serve as the reference beam.

Interposed Support 16 and Laser 17 is a Focusing Lens 22. The output energy from Laser 17 is focused by Lens 22 at Pinhole 19, which is provided in the Material 18. Pinhole 19 serves as a single point object so that the light passing through Pinhole 19 is formed into an interface pattern which is received by the Photographic Plate 21. In order to produce a hologram at Photographic Plate 21, which serves as a Fresnel Zone Plate, it is necessary to illuminate the Photographic Plate 21 with a reference beam having a wavelength the same as the wavelength of energy emanating from Laser 17. This can be accomplished by using the output from Laser 17 if Material 18 partially or completely transmits the energy from Laser 17. Alternatively, if desired, an optical reflecting system employing prisms or mirrors can be used to direct a portion of the output from Laser 17 around the device so that Photographic Plate 21 is illuminated from the other side, that is, the right side as illustrated in FIG. 2. After Photographic Plate 21 is simultaneously illuminated with the interference pattern from Pinhole 19 and the reference beam, Plate 21 is developed in much the same manner as a photographic plate to permanently record the interference pattern.

After the interference pattern is permanently recorded to form a Fresnal Zone Plate, the device can be used as a spectrometer in any of several manners, one of which is illustrated in FIG. 4. In FIG. 4 the permanently recorded interference pattern, or Fresnal Zone Plate, 21 is conditioned to receive white light from a Source 23 through Recording Pinhole 19. The white light emanating from Source 23 can be passed through a pinhole (not shown) so that it appears as a point source. The white light is focused at Pinhole 19 and continues through Support 16 to illuminate interference Pattern 21. Light passes through Interference Pattern 21 and focuses at some point beyond Pattern 21, depending upon the wavelength of the energy. A Slidable Pinhole 24 is provided in a Slide 25 which is retained in a Tubular Member 27. Slide 25 is supported in Tube 27 so that it is longitudinally slidable to vary the distance between Interference Pattern 21 and Pinhole 24 while maintaining the axial alignment of Pinholes 19 and 24.

A Detector 28 is positioned behind Pinhole 24 so that light leaving Pattern 21 passes through Pinhole 24 and impinges on Detector 28.

As described hereinabove, light emanating from Interference Pattern 21 is focused at some point beyond the pattern in accordance with the wavelength of the light. Accordingly, the various wavelengths of light which compose Source 23 can be detected and identified by moving Pinhole 24 to maximize the output from Detector 28. Detector 28 can be a photomultiplier or some other type of energy detector.

If the wavelength $\lambda$ of the energy emanating from illumination Source 23 is the same as that which formed the interference pattern, that is, $\lambda_1$ illustrated in FIG. 2, the illumination passing through Fresnal Zone Pattern 21 will focus at a point spaced the same distance from Pattern 21 as Pinhole 19. However, if the wavelength $\lambda_x$ of the energy emanating from illumination Source 23 is different from $\lambda_1$, the energy passing through Interference Pattern 21 will focus at a point spaced differently from Interference Pattern 21 than Pinhole 19.

The change of focusing point as a function of wavelength is explained by use of the known theory of Fresnal Ring Interference. A Fresnal Ring pattern is shown in FIG. 5. The radius of the $n^{th}$ ring is $$R_n \approx R_1 \sqrt{n}$$

where:
$R_1$ = the radius of the first ring
$n$ = the number rings
If the ring pattern was recorded using a wavelength $\lambda_1$, radius $R_1$ can be defined as $$R_1^2 = 2\lambda_1 Z_1$$

where:
$Z_1$ = the distance between the source and pinhole.
Hence, assuming a constant $Z_1$ factor, a specific wavelength $\lambda_x$ is focused at $f(\lambda_x) = R_1^2 2\lambda_x$. The unfocused wavelengths will be almost entirely rejected by the pinhole.

The Photomultiplier 28 signal $R_o$ as a function of Z is $R_o(Z)$, resulting in a peak output as shown in FIG. 5. It is thus apparent that movement of the source will change the output received by Detector 28. The width of the peak of FIG. 5 is determined by the depth of focus ($f/D$) and is $\lambda(f/D)^2$.

Two wavelengths $\lambda$ and $\lambda+\Delta\lambda$ will be distinguishable if $$f(\lambda) - F(\lambda+\Delta\lambda) \geq Z\lambda = \lambda(f/D)^2 \quad -(df/d\lambda)\Delta\lambda = f(\Delta\lambda/\lambda)$$

hence:

$$(\Delta\lambda/\lambda) \geq (\lambda f/D^2) = R_1^2/2D^2$$

where:
$D$ = Diameter of the largest ring in the interference pattern
$f$ = Distance at which the light diffracted by FZP is focused Because the white light source used as illumination Source 23 contains several wavelengths of energy, the determination of the wavelengths of the component frequencies requires changing the length of the optical path of light from Pattern 21 to Pinhole 24. One way to change the optical path length is to move Pinhole 24 along the axis connecting Pinole 24 and Pinhole 19, as explained with respect to FIG. 3 hereinabove. The change in position of Pinhole 24 results in the focusing of the various wavelengths of light exactly at Pinhole 19.

The system shown in FIG. 4 can be utilized as a spectrum analyzer simply by coupling Photomultiplier 28 to an approximate readout device. Then, by changing the optical path length in one of the manners described hereinabove and noting the position changes of the elements moved, when the photomultiplier has a maximum output, it is possible to determine the wavelength composition of the radiation emanating from Source 23.

Alternatively, the system can be utilized to detect the presence of a particular substance or compound in the atmosphere. For example, this can be done by determining the wavelength of radiation passing from this compound. This is easily done by the use of known techniques, and the spectrum of light passing through most chemicals are known and can be obtained from tables. It is therefore possible to arrange the Pinhole 24 with respect to Fresnel Zone Plate 21 a distance which would result in the required focusing. By doing this and then detecting the light passing through the atmosphere where the presence of the compound is suspected and noting the output from the photomultiplier located in the proximity of Pinhole 24, it is possible to determine the presence or absence of the compound in the atmosphere through which the light passed.

The detection of pollutants or gases at distances can be affected, and the analyzation of light at large distances can be enhanced by utilizing a telescope along with the system shown in FIG. 4. In such a system the telescope is arranged in front of Lens 26 and serves to focus light from distant energy sources onto Lens 26, and hence Pinhole 19, as required for analyzation. The telescope used can be of known type, and its insertion into the system is within the purview of those skilled in the art.

The invention is convenient for spectrometric usages because it is an accurate device and is also very simple and inexpensive to manufacture. The invention is also advantageous because the optical components associated with it need not be precision or compensated. The resolution described hereinabove could ordinarily be realized only if the optical focusing elements, such as the lens or telescope, were perfect within a fraction of a wavelength. Thus, all lens, glass plates, and emulsions would have to be perfect to a factor of 2/20. This is a very difficult and very expensive requirement to achieve. In the inventive system all lenses and optical components can be employed in the same geometrical relationship to both record the interference pattern and to make the spectrographic measurements. It is therefore possible to use less accurate optical components, because imperfections will inherently be compensated because the "errors" caused by the imperfections during recording will be exactly offset during reconstruction.

The capability of utilizing less perfect optical components extends to the fabrication of the inventive system. Accordingly, Pinhole 19 can be dimensioned and positioned less critically because the errors of recording and reconstructing are offsetting. Tolerance considerations of movable Pinhole 24 are alleviated because optical demagnification is used. This occurs because movable Pinhole 24 is a relatively long distance from Pinhole 19/Zone Plate 21 combination, resulting in a less stringent tolerance requirement.

In the embodiments described hereinabove, the optical path length is changed by changing the position of one or more elements of the optical system. Another technique for changing the optical path length includes changing the index of refraction of the optical system. In the system of FIG. 2 the index of refraction can be made variable by fabricating Support Element 16 as a transparent hollow member. Provision for inserting, and removing, a liquid from the cavity of the support must also be made. A liquid having a known index of refraction is placed in Support 16 and an interference pattern recorded utilizing a known wavelength of light. When using the element as a spectrometer light having a wavelength the same as that used in making the recording will focus at a point spaced from Interference Pattern 21 equal to the spacing of Pinhole 19 from Interference 21. However, other wavelengths will focus either in front of, or behind, this point. The optical path length through Support 16 can be changed by changing the index of refraction of Support 16. In FIG. 3, the optical path length can be increased by decreasing the index of refraction of the liquid within Support 16. Obviously, a decrease of the optical path length is effected by increasing the index of refraction. Thus, identification of the component frequencies of Source 23 can be made by changing fluids in Support 16.

FIG. 7 schematically shows a preferred embodiment employing the technique of changing the optical path length of the system by varying the index of refraction of the system. The system includes Support 16, which can have a variable or fixed index of refraction, a Pinhole 19, and interference pattern Recording Medium 21 in the same manner as the FIG. 2 embodiment. Support 16 is rigidly affixed to a hollow Lens 33 so that light from Pattern 21 passes to a Pinhole 34 contained in Lens 33. Lens 33 is provided with a Plug 36 of any convenient type so that fluid can be placed into and taken out of Lens 33. A Detector 37 is positioned in the proximity of Pinhole 34 to show focusing and nonfocusing at Pinhole 34.

A Light Support 38 and a Lens Support 39 are provided at the input end of the system. Supports 38 and 39, respectively, support Light Source 41 and focusing Lens 42. Source 41 is the source being analyzed and Lens 42 focuses the light at Pinhole 19.

Source 41, Lens 42, Optical Support 16, and Hollow Lens 33 are mounted on a Mount 43 so that their relative orientations and separations are fixed.

When an interference pattern is recorded, Source 41 is replaced with a coherent source of light and Medium 21 illuminated as described hereinabove with respect to FIG. 2. At the time of recording, Hollow Lens 33 will contain a fluid, either liquid or gas, having an index of refraction which causes focusing of the recording wavelength at Pinhole 34. The interference pattern is then permanently recorded.

The source of coherent light is then replaced with Source 41 which is to be analyzed. If Source 41 contains a component frequency having a wavelength equal to the recording wavelength, a peak output similar to that shown in FIG. 6 is obtained. Other wavelengths will focus either in front of or behind Pinhole 34. These wavelengths can be brought to focus at Pinhole 34 by appropriately increasing or decreasing the index of refraction of the fluid contained in Hollow Lens 34. The relationship of the focal length, wavelength, and index of refraction is shown by the expression: cl $f = R_1^2/2n\lambda$ where:

$R_1$ = the distance to the first ring in the FZP
$\lambda$ = the wavelength of the illuminating energy in vacuo
$n$ = the refractive index of the optical path medium If $f$ and $R_1$ are constant, the wavelength focused onto the pinhole is inversely proportional to the refractive index:

$$\lambda = \alpha/n$$

where:

$$\alpha = R_1^2/2f$$

If desired, Optical Support 16 can also be made to have a variable index of refraction. Because it is possible to vary the index of refraction of either Support 16 or Lens 33, or both, a wide range of variations are possible so that sources having a wide range of spectrum components can be accurately analyzed.

Several advantages of the system of FIG. 7 are readily apparent. Firstly, because the same optical elements are used in both recording and reconstructing, and because the positions and orientations of the elements are fixed, a very complete compensation for deficiencies of the elements is automatically provided. Secondly, because no dimensional information is required, the elements can be permanently and firmly applied to Mount 43, and the unit accordingly is very rugged. Also, because of the automatic compensation, inexpensive optical elements can be used. For the same economic reasons, precise mounting of the elements is not required, thus greatly decreasing labor costs in fabrication of the system.

FIG. 3 shows another technique for using the permanently recorded Fresnel Zone Plate as a spectrometer. In FIG. 3 the permanently recorded interference pattern, or Fresnel Zone Plate, 21 is positioned to receive white light from a Source 46 through a Pinhole 47. The white light emanating from Pinhole 47 is focused by way of a Lens 48 so that it impinges upon the interference pattern as essentially parallel rays. If the wavelength λ of the energy emanating from illumination Source 46 is the same as that which formed the interference pattern, that is, $\lambda_1$ illustrated in FIG. 2, the illumination passing through Fresnel Zone Pattern 21 will focus at Pinhole 19 contained within the Layer 18. However, if the wavelength $\lambda_x$ of the energy emanating from illumination Source 46 is different from $\lambda_1$, the energy passing through the interference Pattern 21 will focus at a point on either side of Pinhole 19, as indicated by the dotted lines 49. The focusing of energy at Pinhole 19 can be detected by using a Detector 28 in the same manner described with respect to the other embodiments.

When a white light source is used as illumination Source 46, the light emanating through Pinhole 47 will contain several wavelengths of energy. In the prior art techniques the different focusing points of this energy with respect to Pinhole 19 will be determined by moving Pinhole 19 with respect to Interference Pattern 21. However, in the inventive system, this cannot be done because the spacing between Pinhole 19 and the Interference Pattern 21 has been fixed by the application of these two elements onto the transparent Medium 16. Therefore, in order to determine the wavelength of the component frequencies of light Source 46 it is necessary to change the length of the optical path of light from Source 46 to Pinhole 19, This is accomplished by moving Pinhole 47 along the axis connecting Pinhole 47 and Pinhole 19, that is, along an axis perpendicular to the surface of Interference Pattern 21. The change in position of Pinhole 47 results in the focusing of the various wavelengths of light exactly at Pinhole 19 in accordance with the relationships presented hereinabove.

What is claimed is:

1. A spectrometer for identifying the wavelengths of electromagnetic energy emanating from a source comprising:
    energy transparent support means having two parallel plane faces in a predetermined spaced relationship and an optical axis passing through both of said parallel faces;
    an opaque material disposed over one of said parallel faces, said opaque material having a radiation aperture aligned with said optical axis;
    a permanent interference pattern indicative of said radiation aperture disposed on the other of said two parallel plane faces for forming serially disposed images of said source along said optical axis wherein each of said images is indicative of a particular wavelength of energy emanating from said source;
    energy detector means disposed along said optical axis for detecting energy from said source after passing through said interference pattern;
    means for varying the position of said images along said optical axis so that each image can be individually detected by said energy detector and the different wavelengths of energy indicative of each image determined.

2. The spectrometer of claim 1 wherein said interference pattern faces said source and said detector is located behind said radiation aperture, said spectrometer further includes an entrance pinhole aligned with said optical axis interposed between said source and said interference pattern so that individual wavelengths of light are identified by varying the position of the images of the pinhole to individually focus on said detector through said radiation aperture.

3. The spectrometer of claim 2 wherein said support means is a solid element said means for varying is a means for optically varying the distance between said pinhole and said interference pattern.

4. The spectrometer of claim 1 further including a two-sided optical member serially disposed with respect to said support means along said optical axis, said optical member having an exit pinhole on one of said sides and the other of said sides, being adjacent to said interference pattern wherein:
    said energy detector is located behind said exit pinhole; and said means for varying includes means for varying the index of refraction of at least one of said optical member and said support means.

5. The spectrometer of claim 4 wherein said support means is a hollow member having means for inserting and removing fluid to thereby change the index of refraction of said support means, said means for varying is a means for inserting and removing from said support means fluids having different index' of refraction.

6. The spectrometer of claim 5 wherein said optical member is a solid member.

7. The spectrometer of claim 5 wherein said optical member is a hollow member having means for inserting and removing fluid to thereby change the index of refraction of said optical member, said means for varying is a means for inserting and removing from said optical member fluids having different index' of refraction.

8. The spectrometer of claim 1 wherein said radiation aperture faces said source said means for varying includes a pinhole slidably supported between said interference pattern and said detector so that individual wavelengths of light are identified by changing the spacing between said interference pattern and said pinhole.

9. The spectrometer of claim 8 wherein said detector is arranged to slide along with said pinhole.

* * * * *